United States Patent
Liu et al.

(10) Patent No.: US 6,716,339 B2
(45) Date of Patent: Apr. 6, 2004

(54) HYDROTREATING PROCESS WITH MONOLITHIC CATALYST

(75) Inventors: Wei Liu, Painted Post, NY (US); Charles M. Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/821,927

(22) Filed: Mar. 30, 2001

(65) Prior Publication Data

US 2003/0015457 A1 Jan. 23, 2003

(51) Int. Cl.$^7$ .............................................. C10G 45/04
(52) U.S. Cl. ................... 208/208 R; 208/209; 208/213; 208/216 R; 208/216 PP; 208/217; 208/251 R; 208/254 R; 208/263; 208/251 H
(58) Field of Search ................................ 208/208 R, 209, 208/213, 216 R, 216 PP, 217, 251 R, 254 R, 263, 251 H

(56) References Cited

U.S. PATENT DOCUMENTS

| | | | |
|---|---|---|---|
| 3,489,809 A | 1/1970 | Keith et al. | 260/677 |
| 3,885,977 A | 5/1975 | Lachman et al. | 106/62 |
| 4,163,750 A | 8/1979 | Bird et al. | 260/409 |
| 4,529,718 A | 7/1985 | Dupin | 502/439 |
| 4,552,748 A | 11/1985 | Berglin et al. | 423/588 |
| 5,063,043 A | 11/1991 | Bengtsson | 423/588 |
| 5,278,123 A | 1/1994 | Chopin et al. | 502/200 |
| 6,005,143 A | 12/1999 | Machado et al. | 564/423 |

FOREIGN PATENT DOCUMENTS

| | | |
|---|---|---|
| EP | 384 905 | 2/1989 |
| EP | 319 208 | 6/1989 |
| EP | 667 807 | 11/1994 |
| EP | 885 273 | 12/1996 |
| GB | 963 941 | 7/1964 |
| GB | 1 216 456 | 12/1970 |

OTHER PUBLICATIONS

P.G. Menon, M.F.M. Zwinkels, E.M. Johansson, and S.G. Järäs in "Monolithic Honeycombs in Industrial Catalysis", *Kinetics and Catalysis*, 39(5), 615–624 (1998).

A. Cybulski and J.A. Moulijn, "Monoliths in Heterogeneous Catalysis", *Catal. Rev.–Sci. Eng.*, 36(2), 179–270 (1994).

H. A. Smits et al., "Selective Three–Phase Hydrogenation Of Unsaturated Hydrocarbons In A Monolithic Reactor", *Chemical Engineering Science*, 51(11), 3019–3025 (1996).

K. G. Knudsen et al., "Catalytic and Process Technologies for Ultra Low Sulfur Diesel", *Applied Catalysis A: General*, 189 (1999), 205–215.

S. Irandoust and O. Gahne, "Competitive Hydrodesulfurization and Hydrogenation in a Monolithic Reactor", *AIChE Journal*, 36 (5), pp 746–752 (1990).

A. Stankiewicz, "Process intensification in in–line monolithic reactor", *Chemical Engineering Science*, 56 (2001), 359–364.

A. Cybulski et al., "Monolithic Reactors for Fine Chemicals Industries: A Comparative Analysis of a Monolithic Reactor and a Mechanically Agitated Slurry Reactor", *Chemical Engineering Science*, 54 (1999) 2351–2358.

R. K. Edvinsson et al., "A comparison between the monolithic reactor and the trickle–bed reactor for liquid–phase hydrogenations", *Catalysis Today* 24 (1995), 173–179.

V. Regaini and C. Tine, "Upflow Reactor For The Selective Hydrogenation Of Pyrolysis Gasoline—A Comparative Study With Respect To Downflow", *Appl. Catal.*, 10 (1984), 43–51.

A. A. Klinghoffer et al., "Calalytic Wet Oxidation Of Acetic Acid Using Platinum On Alumina Monolith Catalyst", *Catalysis Today*, 40 (1998) 59–71.

V. Hatziantoniou et al., "Mass Transfer And Selectivity In Liquid–Phase Hydrogenation Of Nitro–Compounds In A Monolithic Catalyst Reactor With Segmented Gas–Liquid Flow", *Ind. Eng. Chem. Process Des. Dev.*, 25 (1986), 964–970.

D.S. Soni and B.L. Crynes, "A Comparison of the Hydrodesulfurization and Hydrodenitrogenation Activities of Monolith Alumina Impregnated with Cobalt and Molybdenum and a Commercial Catalyst", *ACS Symp. Ser.*, 156 (1981), 156–207.

R. K. Edvinsson et al., "Liquid–Phase Hydrogenation of Acetylene in a Monolithic Catalyst Reactor", *Ind. Eng. Chem. Res.*, 34 (94), I11–I14 (1995).

*Primary Examiner*—Walter D. Griffin
*Assistant Examiner*—Tam Nguyen
(74) *Attorney, Agent, or Firm*—Kees van der Sterre

(57) ABSTRACT

Liquid hydrocarbons such as gas oil feedstocks are hydrotreated by passing feedstreams comprising a hydrogen-containing gas and the liquid hydrocarbons through a catalyst bed comprising honeycomb or similarly structured monolithic hydrotreating catalysts at controlled superficial liquid linear velocities and gas:liquid feedstream ratios; good hydrotreating selectivity and high one-pass conversion rates for sulfur and other heteroatoms are provided.

28 Claims, 2 Drawing Sheets

HYDROTREATING PROCESS WITH MONOLITHIC CATALYST

BACKGROUND OF THE INVENTION

The hydrotreating process is a dominant process technology in refineries for fuel upgrading and clean-up. The hydrotreating reaction can be classified into four categories: hydrodesulfurization (HDS), hydrodenitrogenation (HDN), hydrodemetallation (HDM), and hydrodeoxygenation (HDO). In many cases, these reactions proceed simultaneously inside the reactor. Among them, HDS is of primary importance. The HDS reaction involves the breakage of C-S bonds by addition of hydrogen molecules so as to release sulfur as $H_2S$ gas. C-S bonds often exist inside an aromatic molecular structure, requiring the HDS reaction to be concomitant with aromatic saturation.

Recently enacted U.S. legislation requires a reduction in diesel fuel sulfur level to 15 ppmw by July 2006 for most of the nation's large refiners. These regulations will force the refining industry to make significant capital investments to increase their HDS capability. Presently available commercial hydrotreating process and catalyst technology may not provide cost-effective solutions to meet this need. The present invention provides monolith-based HDS catalysts and processes that offer significant improvements in conversion efficiency over presently available commercial hydrotreating technology.

Current commercial HDS technology is mature and is based on cobalt/molybdenum impregnated gamma-alumina or on nickel/molybdenum impregnated catalysts. These catalysts are employed in large reactors as random packed beds of spherical, cylindrical, or shaped extrudate beads. HDS reactors typically operate in a trickle-bed mode wherein the raw, high sulfur-containing distillate-range hydrocarbon liquid flows at relatively low velocity downward through the catalyst bed, while a hydrogen-rich treat gas flows co-currently downward through the catalyst at a much higher velocity. Organic sulfur compounds and organic nitrogen compounds in the distillate are converted to hydrogen sulfide and ammonia, which are separated from the treated liquid product downstream in the vapor/liquid separator and in a stripper distillation tower. The sour gas is often treated by amine absorption to remove the $H_2S$ and $NH_3$, with the large excess of hydrogen containing gas recycled back to the process. The recycle gas rate is adjusted so as to provide a large excess of hydrogen over the stoichiometric requirements for reaction.

In addition to HDS and HDN reactions, other hydrotreating reactions also can occur in parallel during processing, including saturation of olefin and aromatic compounds. These reactions consume hydrogen and release heat, which tends to increase the capital and operating cost of the process. Much of the research and development activity today for conventional HDS catalysts is aimed at higher volumetric activity for desulfurization and improved selectivity in order to reduce excess hydrogen consumption. However, no major breakthrough HDS technology has been reported that drastically enhances the HDS activity for production of ultra low sulfur (ppm level) diesel fuel production in a cost-effective way.

A review of existing catalyst and process technology options is given by Knudsen, "Catalytic and Process Technologies for Ultra Low Sulfur Diesel", *Applied Catalysis A: General*, 189 (1999) 205–215. It is generally recognized that a 4 to 5 times enhancement in catalyst activity will be needed for low sulfur diesel production; optimization of conventional catalyst pellets is expected to yield only about a 25 to 100% activity improvement much short of the desired activity. Further activity enhancements may be realized by optimizing process conditions, such as reaction temperature, gas/liquid ratio, reactor pressure, gas flow rate, hydrogen gas purity, etc. All of these improvements are incremental in nature and typically require large capital investment.

References to the concept of utilizing monolithic catalysts for hydrotreating reactions may be found in the literature, although no practical utility has yet been disclosed. For example, CoMo/alumina monolith catalysts have been tested for the HDS and HDN treatment of heavy oil, as reported by D. S. Soni and B. L. Crynes in "A Comparison of the Hydrodesulfurization and Hydrodenitrogenation Activities of Monolith Alumina Impregnated with Cobalt and Molybdenum and a Commercial Catalyst", *ACS Symp. Ser.*, 156, 156–207 (1981). The rates of fluid flow through the catalyst in this study (<0.02 cm/sec) are very low and suggest no practical advantage over conventional pelletized catalysts. A further investigation of the HDS reaction over a CoMo/alumina monolith catalyst in a model reactor is reported by S. Irandoust and O. Gahne in "Competitive Hydrodesulfurization and Hydrogenation in a Monolithic Reactor", *AIChE Journal*, 36 (5), pp 746–752 (1990). However, this kinetic study involved only the conversion of a simple hydrocarbon feed in a laboratory bench reactor at high recycling rates and low conversions per pass. Again, these are conditions that are of no practical interest for the commercial hydrotreating of complex refinery distillates, gas oils, or the like.

SUMMARY OF THE INVENTION

The present invention involves the use of a monolithic catalyst reactor to achieve high one-pass conversion rates in the hydrotreating of complex oil streams under reaction conditions of practical utility for commercial HDS processing. We have found that catalyst and reactor efficiency in the HDS process can be substantially improved by taking advantage of the unique parallel channel geometry of monolithic catalysts of honeycomb configuration. Monolithic honeycomb catalyst and reactors employing them operate in a fundamentally different way from conventional pellet catalysts and trickle bed reactors incorporating randomly packed catalyst beds. By uniformly distributing gas and liquid to each channel, the issues of partial wetting and stagnant fluid areas are significantly reduced, and overall catalyst volumetric efficiency is increased.

BRIEF DESCRIPTION OF THE DRAWINGS

The invention may be further understood by reference to the drawings, wherein.

DETAILED DESCRIPTION

Figure 1:
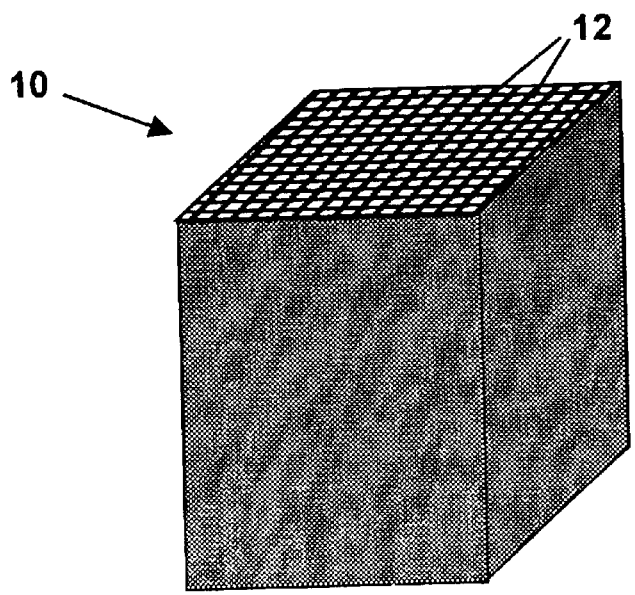
FIG. 1 is a schematic perspective view of a section of monolithic honeycomb HDS catalyst according to the invention.

Monolithic catalysts suitable for use in the invention may be prepared either by forming hydrotreating catalysts into honeycomb shapes or, more preferably, by catalyzing the walls of monolithic honeycomb substrates with hydrotreating catalysts. Conventional hydrotreating catalysts such as, Co, Ni, Mo, and W, alone or in combination with other catalyst additives and promoters such as phosphorus can be used. While molybdenum-containing catalysts are presently preferred, other hydrotreating catalysts, some including metals selected from Group VIII of the Period Table, are also being developed for this application.

The monolithic substrate used to provide a hydrotreating catalyst according to the invention is preferably a channeled inorganic honeycomb structure incorporating walls having surfaces formed of porous ceramic material containing the hydrotreating catalyst to be used. The porous ceramic material, which may make up the entire wall thickness or be provided as a coating on an underlying wall structure, will typically be alumina or another alumina-containing material such as an alumina-silica ceramic. Zeolite materials are examples of alumina-silica materials which can be used.

For most effective conversion, the catalyzed porous walls of the honeycomb may have an average pore size from 2 nm to 1000 nm with BET surface areas in the range of about 10 to about 400 m$^2$/g. Where a wall material of alumina is to be used as a substrate for an applied catalyst, gamma-alumina honeycomb substrates can be used, or honeycombs formed of other durable materials such as cordierite (a magnesium aluminosilicate) can be provided with a coating of alumina. Conventional catalyst loadings may be used; metal catalyst concentrations in the range of 2 to 30 wt % based on the weight of the monolith will be suitable.

In a monolith reactor provided in accordance with the invention, the liquid reactant will preferably flow downward through each monolith channel as a thin film flowing along the channel walls, while the remainder of each channel will be filled with hydrogen gas. Thus, excess gas will be available at any given point along the monolith channel. Formation of a thin film on the catalyst wall greatly facilities the mass transfer of both gas and liquid reactant into the catalyst micropores where the hydrotreating reactions occur. The liquid film may in fact be completely vaporized as the reactions proceed, but will quickly be replenished by incoming fluid. As a result, the hydrotreating reactions are intensified. The dynamic transport and reaction of the reactants at the liquid/catalyst surface interface presents an improved reaction environment that is significantly different than the environment within a trickle bed reactor.

It is known that the HDS conversion rate within a trickle bed reactor increases with a decrease of liquid-hourly-space-velocity (LHSV), defined as the following:

$$LHSV = \frac{F_{feed}}{V_{pellet}} \quad (1)$$

$$V_{pellet} = V_{bed} - V_{void} = V_{bed} \cdot (1-\epsilon_{pp}) \quad (2)$$

$$LHSV = \frac{F_{feed}}{V_{bed} \cdot (1-\epsilon_{pp})} \quad (3)$$

where $F_{feed}$=flow rate of liquid feed at standard condition;
$V_{bed}$=total volume of reactor vessel packed with catalyst pellets;
$V_{pellet}$=volume of catalyst pellet itself;
$V_{void}$=volume of void within the packed bed; and
$\epsilon_{pp}$=void fraction of catalyst bed packed with catalyst pellets.

LHSV is defined as the ratio of liquid feed volume at standard conditions (1 atm, 20° C.) to the catalyst volume. In other words, HDS conversion in trickle bed reactors is known to increase as catalyst volume increases. For a given reactor vessel, the catalyst volume is increased by minimizing void fraction. Improving the catalyst packing method can reduce the void fraction in trickle bed reactors. For example, using the so-called "dense packing" method typically reduces the void fraction by about 10% over the more randomly-packed "sock loading" method. However, given the nature of packed beds and the geometry of particle shapes, the void fraction is still often limited to about 0.35.

For a monolith reactor packing comprising monolithic honeycomb catalyst with square channels, LHSV is linked to monolith geometry parameters by the following equations:

$$LHSV = \frac{F_{feed}}{l_{length} \cdot n_{cell} \cdot ((l_w + l_c)^2 - l_c^2)} = \frac{F_{feed}}{V_{Bed} \cdot (1-\epsilon_{MR})} \quad (4)$$

$$V_{bed} = l_{length} \cdot n_{cell} \cdot ((l_w+l_c)^2 - l_c^2) \quad (5)$$

$$\epsilon_{MR} = \frac{1}{(l_w/l_c + 1)^2} \quad (6)$$

where $V_{Bed}$=total reactor volume;
$n_{cell}$=cell density, number of channel per unit cross-sectional area;
$l_c$=width of channel opening;
$l_w$=catalyst wall thickness;
$\epsilon_{MR}$=void fraction of monolith reactor; and
$l_{length}$=reactor length.

Figure 2:
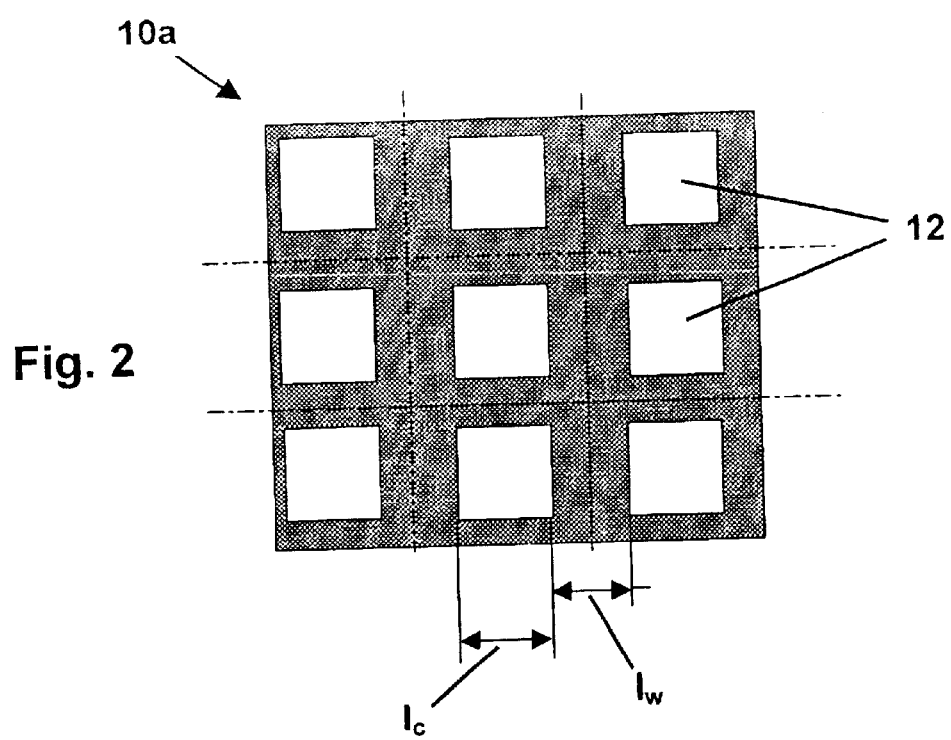
FIG. 2 is a top plan view of a section of the honeycomb of FIG. 1.

These geometric parameters are better illustrated with reference to a typical monolithic honeycomb catalyst design schematically shown in FIGS. 1 and 2 of the drawings. FIG. 1 is a perspective view of a typical section of a honeycomb catalyst 10 incorporating a plurality of square, open-ended channels 12 traversing the catalyst from end to end. FIG. 2 is a top plan view of a portion 10a of that catalyst wherein two geometric parameters affecting catalyst void fraction and catalyst performance, i.e., channel opening width $l_c$ and catalyst wall thickness $l_w$, are illustrated.

Compared with a catalyst bed packed with catalyst pellets, the void fraction of a monolith catalyst bed is highly tunable by changing the ratio of wall thickness to channel opening. Thus, for a given catalyst bed volume, the LHSV of a monolith reactor can be adjusted by changing geometric cell parameters, whereas LHSV in a conventional packed bed reactor generally has little room for variation.

Figure 3:
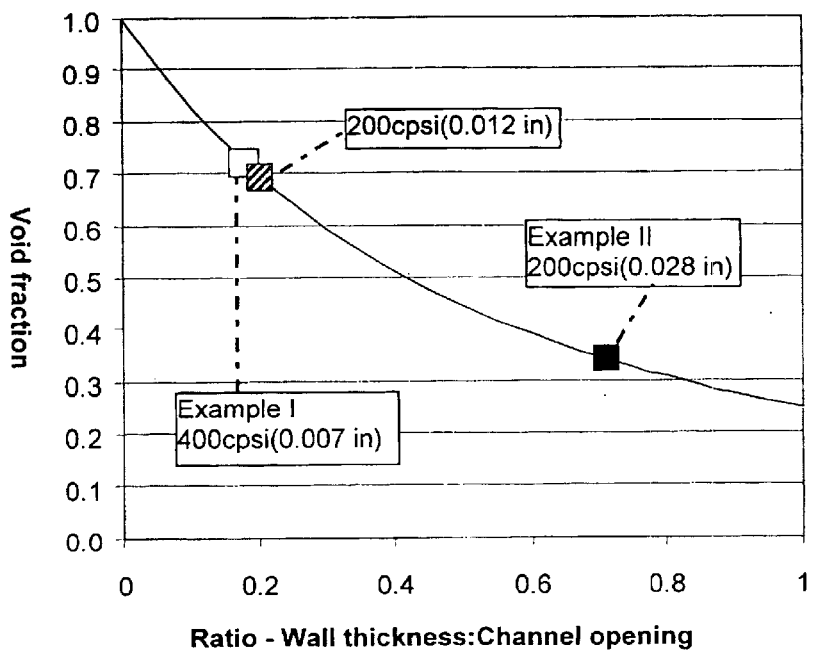
FIG. 3 is a graph plotting honeycomb catalyst void fraction as a function of honeycomb geometry variables shown in FIG. 2.

The flexibility of monolithic honeycomb catalysts in this regard is better illustrated in FIG. 3 of the drawing, which plots the catalyst void fraction of a honeycomb packing as a function of the ratio of honeycomb wall thickness to honeycomb channel opening. As shown in FIG. 3, a void fraction of about 0.7 can be achieved either with a monolithic substrate having a channel density of about 400 channels per square inch (cpsi) and a channel wall thickness of about 0.007 inches (a 400/7 monolith), or with a monolithic substrate having a channel density of about 200 cpsi and a channel wall thickness of about 0.012 inches (a 200/12 monolith).

These void fractions are substantially higher than the number for a typical packed pellet bed (~0.35). However, the monolith void fraction can be decreased by increasing the wall thickness while the cell density being kept constant. For example, the void fraction of a 200 cpsi monolith may be decreased to 0.34, a value similar to that of a packed pellet bed, by increasing the wall thickness from 0.012 inches to 0.028 inches. In general, the monolithic honeycomb catalysts of the invention will be selected to have void fractions in the range of 0.2–0.9, the particular value selected depending upon the particular process and particular feedstock to be treated.

From the above analysis it would be expected that monolithic catalysts would offer little advantage over packed pellet bed catalyst from the standpoint of attainable LHSV values, since the void fraction is comparable to that of a packed catalyst bed. As a practical matter, no reactor vessel can be fully occupied by the catalyst since adequate void volume has to be left to allow the fluid to pass through. Of course, limited improvements in catalyst pellet effectiveness are achievable. For example, J. Hanika and K. Sporka in "Catalyst Particle Shape And Dimension Effects On Gas Oil Hydrodesulfurization", *Chemical Engineering Science*, 47 (9–11), 2739–2744 (1992), showed that for the HDS reaction of gas oil over catalyst pellets of different diameters, if the effectiveness factor is 1.0 for a catalyst of 0.07 mm diameter, then the effectiveness factor is reduced to 0.82 with a 0.24 mm diameter catalyst, and is further reduced to 0.59 with a 1.2 mm diameter catalyst. In other words, the activity enhancement is only about 70% if the catalyst diameter is reduced from 1.2 to 0.07 mm.

In principle, monolithic honeycomb packings gain some advantage from the fact that at least two of the variables from among the group of available geometric variables of the packings (wall thickness, channel opening, void fraction and cell density) may be independently varied. Thus, wall thickness and void fraction can be independently adjusted, with some advantages being derived from void fraction adjustments and other advantages being derived from catalyst wall thickness adjustments. During the hydrotreating reaction process, hydrogen and liquid reactant must diffuse into the micropores of the catalyst wall to react, while reaction products such as $H_2S$ need to diffuse out of the micropores, and so a thinner catalyst wall could have an advantage if the catalyst were sufficiently concentrated or active. However, the complex mass transfer processes ongoing in three-phase HDS reactors could also obscure any such advantages, and no literature documenting such advantages has been found.

Nevertheless, for reasons not fully understood, we have found that a much higher HDS activity enhancement can be realized through the use of a monolithic honeycomb catalyst than would be expected from theoretical considerations or prior experiment. This higher HDS activity may be realized by conducting the gas/liquid HDS reaction over a monolith honeycomb catalyst within the specific ranges of reaction conditions hereinafter described. Specifically, we have found that one-pass HDS sulfur conversions in excess of 50% are achievable under high liquid linear velocity conditions in these catalysts, with conversions in excess of 90% being routinely achievable within particularly preferred ranges of gas and liquid flow conditions.

One set of preferred process conditions for carrying out HDS reactions in honeycomb catalysts in accordance with the invention includes a liquid superficial linear velocity in the range of about 0.1 to about 10 cm/s, preferably about 0.5 to about 5 cm/s, and a feed hydrogen gas to liquid feed volume ratio of about 10 to about 2000 NL/L, preferably about 50 to about 300 NL/L. For purposes of the present description, gas volumes reported in NL correspond to the volumes that would be occupied by the gas portions of the feed streams at room temperature and one atmosphere of pressure. For best results, reaction temperatures maintained in reactors incorporating these catalysts will range from about 200 to about 500° C., preferably about 250 to about 400° C., and reactor pressures from about 100 to about 2000 psig, preferably in the range of about 300 to about 1000 psig. LHSV values of about 0.1 to about 500 $h^{-1}$, preferably about 0.5 to about 50 $h^{-1}$ can be used. Superficial liquid linear velocities for the purpose of the present description are calculated in the conventional manner by dividing the liquid feed flow rate through the reactor at normal conditions (1 atm. 20° C.) with the cross-sectional area of the monolith reactor.

The invention may be further understood by reference to the following detailed examples, which are intended to be illustrative rather than limiting. These examples are provided to enable those of ordinary skill in the art to use the invention and are not intended to limit the scope of what the inventors regard as their invention. Efforts have been made to ensure accuracy with respect to numbers used to characterize the measured conditions; however, some experimental errors and deviations may be present.

These examples document a series of conversion runs carried out with one of two different catalyst honeycombs, hereinafter referred to as Catalyst A and Catalyst B, respectively. The geometric and compositional features of these catalysts are summarized in Table 1 below. Included in Table I for each of the catalysts described are the honeycomb channel geometries, the composition and amount of catalyst metals applied to each of the honeycombs, reported in percent by weight based on the total weight of the catalyzed honeycombs, and the surface porosity characteristics of the wall surfaces of the catalyzed honeycombs. The surface porosity characteristics, determined from conventional nitrogen adsorption or BET analyses, include the pore volume, the average pore diameter, and the BET surface areas of the catalyzed honeycomb walls.

TABLE 1

Honeycomb Catalysts

| | Catalyst A | Catalyst B |
|---|---|---|
| Catalyst geometry | 400 cpsi | 200 cpsi |
| Channel shape | square | square |
| Channel diameter (mm) | 1.0 | 1.0 |
| Wall thickness (mm) | 0.18 (0.007 in.) | 0.71 (0.028 in.) |
| Catalyst Metal loading (wt %) | | |
| $MoO_3$ | 16.6 | 15.1 |
| $P_2O_5$ | 0.71 | 0.46 |
| $Co_3O_4$ | 3.5 | 3.3 |
| Catalyst Physical Properties | | |
| BET Surface Area ($m^2$/g) | 200 | 172 |
| Pore Volume (cc/g) | 0.50 | 0.45 |
| Average Pore Diam. (nm) | 6.5 | 9.6 |

EXAMPLE I

Gas Oil Hydrotreating—Catalyst A

Cylindrical alumina honeycomb monolith modules of 1 cm diameter and 30 cm length are selected for testing, and these monoliths are catalyzed with cobalt, molybdenum, and phosphorous (CoMoP) by the solution impregnation method. The honeycombs are first immersed under vacuum in a phosphoric acid-containing ammonium heptamolybdate solution followed by channel clearing and calcining to 500° C., and then immersed under vacuum in a cobalt nitrate solution, with the channel clearing and calcining steps being thereafter repeated. The catalyzed modules have the geometry and wall characteristics of Catalyst A in Table 1 above, each comprising 400 cpsi of monolith cross-section taken perpendicular to its length, with channel walls of 0.007 inch thickness defining each of the channels. Following solution impregnation, the catalyst modules are dried and calcined in air by ramping from room temperature to 120° C. at 1° C./min, holding for 2 hours at 120° C., ramping at 1° C./min, and holding at 500° C. for one additional hour.

For testing purposes and to separate catalyst activity effects from liquid segregation effects, one channel in each of the modules is isolated by plugging the other channels of the module with cement at both ends, and the modules are stacked end-to-end to provide a single catalyst module 90 cm in length through which an open channel is provided. The 90 cm module thus provided is then positioned within the isothermal zone of a stainless steel tube reactor of about 1" diameter, and a ⅛" diameter stainless steel inlet tube is cemented into the top channel opening of the catalyst. The inlet tube is connected to a ¼" stainless steel feed tube for delivering hydrogen gas and a liquid gas oil feed stream into the inlet tube. Spaces remaining between the assembled catalyst module and the walls of the tube reactor are then filled with inert SiC particles.

After the reactor system has been pressure tested and purged by inert nitrogen, the Co/Mo/alumina catalyst is sulfided in-situ by passing 30 NL/hour of 3% $H_2S/H_2$ gas through the reactor at a pressure of 41 bar. The reactor temperature is gradually raised from 95° C. to holding temperatures of 200° C., 280° C., and 375° C., being maintained at each holding temperature for about 6 hours. This sulfiding process converts the metal oxide into the metal sulfide that comprises the active catalyst phase.

After sulfiding is completed, tests of reactor performance are carried out over a number of HDS runs under varying reaction conditions. These tests are carried out in co-current downward reactant flow using a straight run gas oil (SRGO) liquid feed and a hydrogen gas feed supplied through the reactor top feed tube at feed rates and other reactor conditions that are held constant throughout each run. The composition and properties of the gas oil, reported in detail in Table 2 below, include a sulfur content of 2310 wppm, a 5% boiling point of 232° C., and a final boiling point of 336° C. Conversion samples are taken from the product stream for each run after steady-state reaction conditions within the reactor are achieved.

TABLE 2

Gas Oil Feed - Composition and Properties

| Composition | | Properties | |
|---|---|---|---|
| Total sulfur, wppm | 2310 | D86 Distillation, ° C. | |
| Nitrogen, wppm | 41.36 | IBP | 146 |
| Carbon, wt. % | 86.7 | 5 | 232 |
| Hydrogen, wt. % | 13.3 | 10 | 248 |
| Bromine number, $gBr_2/100$ g | 0.51 | 20 | 261 |
| Density, g/cc | 0.8581 | 30 | 270 |
| SFC Aromatics, wt. % | | 40 | 277 |
| Saturates | 71.3 | 50 | 283 |
| Monoaromatics | 18.6 | 60 | 290 |
| Diaromatics | 8.9 | 70 | 297 |
| Polyaromatics | 1.2 | 80 | 307 |
| | | 90 | 318 |
| | | 95 | 328 |
| | | FBP | 336 |

Run conditions as well as HDS and HDN conversion results for each of a number of hydrotreating runs carried out on the feedstock of Table 2 above using Catalyst A are reported in Table 3 below.

Included in Table 3 for each of the runs conducted are a run identification number, the age of the catalyst in hours, the temperature and pressure at which the run is conducted, the liquid hourly space velocity of the feed stream through the catalyst calculated on two volume bases, the liquid linear velocity of the oil through the catalyst bed, the gas:oil ratio maintained in the feed stream, the percent of HDS and HDN achieved during the run, and the density of the treated product liquid. Also included in Table 3 for purposes of comparison are HDS results reported in the literature (Prior Art) for a monolithic catalyst tested at low flow liquid flow velocities in a laboratory bench reactor.

The two LHSV values in Table 3 are calculated by normalizing the liquid feed flow rate against two different calculations of catalyst volume. $LHSV_{Bed}$ is based on the collective volume of the channel that is exposed to the oil taken with the entire volume of the solid catalyst walls surrounding the test channel. $LHSV_{cat}$ is based only on the partial volume of the catalyst wall that is considered to be exposed and available to the oil during the testing. The latter values are thought to yield more relevant measurements of catalyst activity. The superficial liquid linear velocities reported in Table 3 are calculated based on the cross-sectional area of the channel opening only.

TABLE 3

Hydrotreating Runs - Catalyst A

| Run I.D. | Catalyst age (hrs.) | Temp. (° C.) | Pressure (bar) | $LHSV_{Bed}$ (hr−1) | $LHSV_{cat}$ (hr−1) | $V_1$ (cm/s) | Gas:Oil (NL:L) | HDS (%) | HDN (%) | Density (g/cc) |
|---|---|---|---|---|---|---|---|---|---|---|
| Prior Art* Catalyst A runs | — | 371 | 103 | 0.65 | — | 0.01 | — | 76.6 | — | — |
| R01 | 110 | 370.2 | 41.4 | 39.3 | 85.6 | 0.94 | 205 | 94.4 | 78.2 | 0.8514 |

TABLE 3-continued

Hydrotreating Runs - Catalyst A

| Run I.D. | Catalyst age (hrs.) | Temp. (° C.) | Pressure (bar) | $LHSV_{Bed}$ (hr-1) | $LHSV_{cat}$ (hr-1) | $V_1$ (cm/s) | Gas:Oil (NL:L) | HDS (%) | HDN (%) | Density (g/cc) |
|---|---|---|---|---|---|---|---|---|---|---|
| R02 | 122 | 370.3 | 41.6 | 38.6 | 84.1 | 0.92 | 208 | 93.4 | 77.2 | 0.8515 |
| R03 | 153 | 367.9 | 41.7 | 61.9 | 134.8 | 1.48 | 252 | 88.5 | 63.7 | 0.8518 |
| R04 | 170 | 368.0 | 41.5 | 61.4 | 133.6 | 1.46 | 254 | 88.4 | 63.8 | 0.8513 |
| R05 | 286 | 370.8 | 41.5 | 14.5 | 31.6 | 0.35 | 273 | 99.9 | — | 0.8465 |
| R06 | 310 | 370.5 | 41.6 | 14.7 | 32.0 | 0.35 | 269 | 99.9 | 94.8 | 0.8466 |
| R07 | 363 | 369.8 | 41.6 | 39.2 | 85.4 | 0.94 | 64 | 82.4 | — | 0.8515 |
| R08 | 374 | 370.0 | 41.7 | 38.8 | 84.4 | 0.92 | 63 | 82.3 | 59.5 | 0.8516 |
| R09 | 386 | 370.0 | 41.6 | 39.5 | 86.1 | 0.94 | 59 | 82.2 | — | 0.8516 |
| R10 | 424 | 400.3 | 41.5 | 38.6 | 84.1 | 0.92 | 211 | 98.0 | 77.1 | 0.8484 |
| R11 | 435 | 400.1 | 41.6 | 39.8 | 86.5 | 0.95 | 204 | 97.9 | 75.9 | 0.8484 |
| R12 | 471 | 340.3 | 41.6 | 40.5 | 88.2 | 0.97 | 200 | 81.3 | 53.6 | 0.8528 |
| R13 | 483 | 340.2 | 41.5 | 40.1 | 87.3 | 0.96 | 202 | 81.1 | — | 0.8529 |
| R14 | 530 | 370.4 | 41.6 | 15.1 | 33.0 | 0.36 | 195 | 99.4 | 86.4 | 0.8487 |
| R15 | 542 | 370.5 | 41.6 | 14.3 | 31.2 | 0.34 | 206 | 99.3 | — | 0.8486 |

*See Soni & Crines, supra.

As is evident from a study of the data in Tables 3 above, excellent HDS performance was exhibited by Catalyst A over the range of reaction conditions reported. In Run 15, for example, 99.3% HDS was achieved under the reaction conditions of 370.5° C., 41.6 bar, $LHSV_{Bed}$ of 14.3 $h^{-1}$, $LHSV_{cat}$ of 31.2 $h^{-1}$, feed gas/oil ratio of 206 NL/L, and superficial liquid linear velocity of 0.34 cm/s even after the catalyst was on-stream for 542 hours. Run 06 shows 99.9% HDS under similar reaction conditions, but at a higher gas/oil ratio (269 NL/L versus 206 NL/L).

Figure 4:
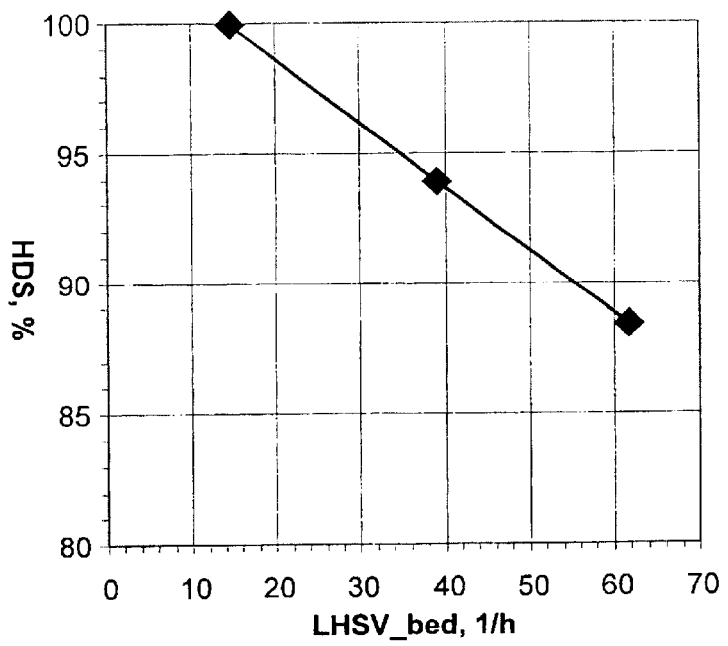
FIG. 4 plots average HDS conversions versus LHSV values for a hydrotreating process carried out in accordance with the invention.

FIG. 4 of the drawing summarizes some of the data presented in Table 3 in the form of a graph plotting average HDS conversions versus average LHSV (bed) values for three different ranges of space velocity investigated, viz., ranges near 14, 39, and 61 $hr^{-1}$, respectively. Apparent from this data is the fact that, even at relatively low reactor temperatures and/or gas:oil ratios, HDS conversions in excess of 80% are routinely obtained.

On the other hand, the HDS conversion data for the comparative example set out in Table 3 above indicates relatively poor performance for the conversion of a raw anthracene feed utilizing the catalyst characterized in that report. Even at similar reaction temperatures, the prior art monolithic reactor achieved a lower HDS conversion rate than any of the monoliths operated under the reaction conditions found effective for efficient HDS conversion in accordance with the invention. This is particularly surprising in view of the fact that the comparative example was carried out at a higher reactor pressure and at a lower liquid hourly space velocity than employed in accordance with the inventive examples—differences that typically would produce higher conversion rates.

Additional details of the compositions and properties for certain products yielded from selected runs reported in Table 3 above are reported in Table 3A below.

TABLE 3A

Properties: Liquid Feed vs. Hydrotreated products (Catalyst A)

| | SRGO | Products (Catalyst A Run No.) | | |
|---|---|---|---|---|
| Property | Feed | R06 | R14 | R11 |
| Total sulfur, wppm | 2310 | 2.3 | 14.8 | 48 |
| Nitrogen, wppm | 41.36 | 2.15 | 5.61 | 9.96 |

TABLE 3A-continued

Properties: Liquid Feed vs. Hydrotreated products (Catalyst A)

| | SRGO | Products (Catalyst A Run No.) | | |
|---|---|---|---|---|
| Property | Feed | R06 | R14 | R11 |
| Carbon, wt. % | 86.7 | 86.25 | NA | 86.90 |
| Hydrogen, wt. % | 13.3 | 13.38 | NA | 13.04 |
| Bromine number, $gBr_2$/100 g | 0.51 | NA | NA | NA |
| Density, g/cc | 0.8581 | 0.8466 | 0.8487 | 0.8484 |
| SFC Aromatics, wt. % | | | | |
| Saturates | 71.3 | 73.5 | 72.2 | 68.3 |
| Monoaromatics | 18.6 | 20.9 | 21.6 | 21.6 |
| Diaromatics | 8.9 | 4.9 | 5.4 | 8.6 |
| Polyaromatics | 1.2 | 0.7 | 0.8 | 1.5 |
| D86 Distillation, ° C. | | | | |
| IBP | 146 | 128 | 131 | 103 |
| 5 | 232 | 193 | 206 | 178 |
| 10 | 248 | 226 | 232 | 219 |
| 20 | 261 | 248 | 252 | 314 |
| 30 | 270 | 260 | 262 | 260 |
| 40 | 277 | 269 | 270 | 269 |
| 50 | 283 | 277 | 278 | 276 |
| 60 | 290 | 284 | 284 | 283 |
| 70 | 297 | 292 | 293 | 292 |
| 80 | 307 | 302 | 302 | 302 |
| 90 | 318 | 315 | 316 | 316 |
| 95 | 328 | 326 | 326 | 329 |
| FBP | 336 | 338 | 336 | 342 |

As Table 3A suggests, the decreases in product sulfur content achieved in accordance with the invention are generally associated with a decrease in liquid product density as well as decreases in di-aromatic compounds and increases in mono-aromatic compounds. These trends are consistent with the fact that most of sulfur in diesel fuel exists in di-aromatic ring compounds. With the addition of hydrogen, sulfur is released from these molecules as H2S and a conversion to mono-aromatic forms occurs. Advantageously, the D86 distillation data in Table 2 shows that product distillation points are comparable to those of the feed. This indicates that the conversions occurring in these monolithic catalysts are proceeding with good selectivity towards the hydrotreating of sulfur compounds, and not towards the hydrocracking of hydrocarbons. Generally, depending upon catalyst and feedstock selection, it is expected that 70% (vol.) or more of the product stream produced by these hydrotreatments will have a D86 distillation temperature range falling in the D86 distillation range of the feedstock.

EXAMPLE II
Gas Oil Hydrotreating—Catalyst B

Several alumina honeycomb monolith modules of 1 cm diameter and 30 cm length are selected for impregnation with a CoMoP catalyst as generally described in Example I above. In this case, however, the modules consist of alumina honeycomb sections having cell densities of 200 cpsi and channel wall thicknesses of 0.028 inches. The impregnated catalysts are dried and calcined in air utilizing staged heating as described in Example I, heating the catalyst from room temperature to 120° C. at 1° C./min with a 2 hour hold at 120° C., followed by further heating at 1° C./min, with a one hour hold at 500° C. The physical and chemical properties for this prepared catalyst are reported as Catalyst B in Table 1 above.

The catalyst is next prepared for testing following the mounting and sulfiding procedures used for preparing Catalyst A in Example 1. Evaluations of the activity of this catalyst are then conducted using the same straight-run gas oil feed employed in the tests reported in Example I. The results of several test runs are reported in Tables 4 and 4A below. Included in Table 4 are the conversion results for a number of runs under differing conditions. Table 4A provides a detailed comparison of the composition and properties of the gas oil feedstock with those of the product of one representative run from Table 4.

TABLE 4

Hydrotreating Runs - Catalyst B

| Run I.D. | Catalyst age (hrs.) | Temp. (° C.) | Pressure (bar) | LHSV$_{Bed}$ (hr−1) | LHSV$_{cat}$ (hr−1) | V$_1$ (cm/s) | Gas:Oil (NL:L) | HDS (%) | HDN (%) | Density (g/cc) |
|---|---|---|---|---|---|---|---|---|---|---|
| R01 | 107 | 369.2 | 41.4 | 20.5 | 24.7 | 1.55 | 240 | 89.6 | — | 0.8517 |
| R02 | 118 | 369.1 | 41.3 | 20.8 | 25.1 | 1.57 | 236 | 90.5 | 56.8 | 0.8517 |
| R03 | 167 | 369.7 | 41.3 | 13.2 | 15.9 | 0.99 | 195 | 96.0 | — | 0.8503 |
| R04 | 183 | 369.8 | 41.4 | 12.6 | 15.2 | 0.95 | 205 | 95.9 | — | 0.8504 |
| R05 | 224 | 370.4 | 41.2 | 5.0 | 6.0 | 0.37 | 254 | 99.1 | — | 0.8470 |
| R06 | 239 | 370.3 | 41.3 | 5.0 | 6.0 | 0.38 | 248 | 99.0 | 90.5 | 0.8467 |
| R07 | 277 | 340.0 | 41.2 | 4.7 | 5.7 | 0.35 | 249 | 95.9 | 88.2 | 0.8487 |
| R08 | 300 | 340.0 | 41.2 | 4.9 | 5.9 | 0.37 | 236 | 96.0 | — | 0.8492 |
| R09 | 335 | 339.9 | 41.3 | 15.1 | 18.2 | 1.14 | 170 | 85.7 | 52.6 | 0.8525 |
| R10 | 348 | 340.0 | 41.3 | 15.1 | 18.2 | 1.14 | 171 | 86.3 | — | 0.8525 |

TABLE 4A

Properties: Liquid Feed vs. Hydrotreated Products (Catalyst B)

| Property | SRGO Feed | Catalyst B Run R03 |
|---|---|---|
| Total sulfur, wppm | 2310 | 91.6 |
| Nitrogen, wppm | 41.36 | NA |
| Carbon, wt. % | 86.7 | NA |
| Hydrogen, wt. % | 13.3 | NA |
| Bromine number, gBr$_2$/100 g | 0.51 | NA |
| Density, g/cc | 0.8581 | 0.8503 |
| SFC Aromatics, wt. % | | |
| Saturates | 71.3 | 72.2 |
| Monoaromatics | 18.6 | 21.3 |
| Diaromatics | 8.9 | 5.7 |
| Polyaromatics | 1.2 | 0.8 |
| D86 Distillation, ° C. | | |
| IBP | 146 | 137 |
| 5 | 232 | 216 |
| 10 | 248 | 238 |
| 20 | 261 | 255 |
| 30 | 270 | 265 |
| 40 | 277 | 273 |
| 50 | 283 | 279 |
| 60 | 290 | 287 |
| 70 | 297 | 295 |
| 80 | 307 | 304 |
| 90 | 318 | 318 |
| 95 | 328 | 328 |
| FBP | 336 | 339 |

As is evident from a study of the conversion data presented in Tables 4 and 4A, the Catalyst B monolithic reactor tested in accordance with Example II again exhibits high one-pass conversions of the liquid feedstock at linear liquid and space velocities within the scope of the invention. All conversions are above 80% and most are above 90% in a single reactor pass.

As in the case of Catalyst A, a decrease in di-aromatic concentration accompanies an increase in mono-aromatic concentration in the Catalyst B-treated product, and the distillation data indicate that product distillation points remain comparable to those of the feed. This again indicates that the process is proceeding with good HDS selectivity.

The advantages of the invention for applications such as fuel processing should be particularly apparent from the above data. It is known, for example, that certain aryl-substituted compounds such as the 4,6-dibenzothiophenes are quite refractory even in relatively severe reducing environments, and therefore difficult to convert through conventional hydrotreating processes. For this reason ultra-deep conversion (>99% HDS) such as may be required to meet new diesel fuel sulfur limits may be impossible to achieve in trickle bed reactors incorporating catalyst pellet beds. The fact that 99.9% one-pass HDS conversions can be obtained under appropriate process conditions with monolithic catalysts such as described above indicates that hydrotreating over monoliths will be a highly effective way to treat a wide variety of sulfur species. Thus monolith hydrotreating reactors appear to offer a significant advantage in performance for processes such as ultra low sulfur diesel fuel production.

One skilled in the art would appreciate based on the prior disclosure the following illustrative embodiment. This invention describes a method for hydrotreating hydrocarbons by feeding a liquid hydrocarbon stream containing heteroatoms and a hydrogen-containing gas over a monolithic catalyst bed that contains hydrotreating catalyst components. This embodiment would have a one-pass conversion of the targeted heteroatom greater than 50% at a superficial liquid linear velocity greater than 0.01 cm/s. Possible treatable heteroatoms include sulfur, nitrogen, metals, and oxygen. This embodiment is flexible enough to process a wide range of hydrocarbon boiling ranges (70 to 700° C.), which covers all applicable refinery and petrochemical liquid streams, such as distillates, gas oils, and gasoline blendstocks. Whereas the expected one-pass conversion of the feed heteroatom is greater than 50%, we fully expect that conversions of greater than 80% and 90% are likely. The preferred operating conditions for this embodiment is the feed hydrogen gas to liquid feed volume ratio greater than about 10 NL/L, the liquid hourly space velocity greater than about 0.7 $h^{-1}$, the reactor pressure greater than 1 bar, and the reaction temperature greater than about 200° C.

Another illustrative embodiment of this invention is for a method for making low-sulfur diesel fuel. Low-sulfur diesel fuel can be created by feeding hydrogen-containing gas and a liquid hydrocarbon stream containing up to 3 wt % sulfur over a monolithic catalyst bed containing hydrotreating catalyst components, then separating the low-sulfur liquid diesel product from the effluent sour gas. This embodiment will produce a diesel fuel product with less than 5000 wppm sulfur, and likely will produce a fuel product with less than 15 wppm sulfur. The preferred operating conditions for this embodiment is the superficial liquid linear velocity greater than about 0.01 cm/s, the feed hydrogen gas to liquid feed volume ratio greater than about 10 NL/L, the liquid hourly space velocity greater than about 0.7 $h^{-1}$, the reactor pressure greater than 1 bar, and the reaction temperature greater than about 200° C.

While the apparatus and methods of this invention have been described in terms of preferred embodiments, it will be apparent to those of skill in the art that variations may be applied without departing from the concept and scope of the invention. All such similar substitutes and modifications apparent to those skilled in the art are deemed to be within the scope and concept of the invention.

We claim:

1. A method for hydrotreating hydrocarbons to remove heteroatoms therefrom comprising:
    a. combining hydrogen-containing gas with a liquid hydrocarbon stream containing sulfur, nitrogen, metal or oxygen heteroatoms to form a feed stream;
    b. passing said feed stream over a monolithic catalyst bed containing hydrotreating catalyst components to remove the heteroatoms therefrom;
    c. wherein the superficial liquid linear velocity of said feed stream is greater than about 0.2 cm/s, the feed hydrogen gas to liquid feed volume ratio is greater than about 50 NL/L, the liquid hourly space velocity is greater than about 0.7 $h^{-1}$, the reactor pressure is greater than about 20 bar, the reaction temperature is greater than about 250° C. and the one-pass conversion of a heteroatom is greater than 50%.

2. The method for hydrotreating hydrocarbons as described in claim 1, wherein said monolithic catalyst bed has a honeycomb configuration.

3. The method for hydrotreating hydrocarbons as described in claim 1, wherein said hydrotreating catalyst components are from the group of cobalt, molybdenum, nickel, tungsten, and phosphorous.

4. The method for hydrotreating hydrocarbons as described in claim 1, wherein said hydrotreating catalyst components are metals selected from Group VIII of the Periodic Table.

5. The method for hydrotreating hydrocarbons as described in claim 1 wherein the monolithic catalyst bed comprises one or more inorganic honeycombs comprising channel wall surfaces formed of an alumina-containing catalyst support material.

6. The method for hydrotreating hydrocarbons as described in claim 5 wherein the channel wall surfaces incorporate an alumina coating.

7. The method for hydrotreating hydrocarbons as described in claim 5 wherein the inorganic honeycombs are formed of alumina.

8. The method for hydrotreating hydrocarbons as described in claim 1 wherein the monolithic catalyst bed comprises one or more inorganic honeycombs comprising channel wall surfaces formed of a zeolite catalyst support material.

9. The method for hydrotreating hydrocarbons as described in claim 1, wherein said liquid hydrocarbon stream has a boiling range within the range of about 70 to about 700° C.

10. The method for hydrotreating hydrocarbons as described in claim 1, wherein the said liquid hydrocarbon stream is from a group of refinery streams consisting of distillates, gas oils, and gasoline blendstocks.

11. The method for hydrotreating hydrocarbons as described in claim 1, wherein the said liquid hydrocarbon stream is in the diesel fuel boiling range.

12. The method for hydrotreating hydrocarbons as described in claim 1, wherein the one-pass conversion of the targeted heteroatom is greater than 80%.

13. The method for hydrotreating hydrocarbons as described in claim 1, wherein the one-pass conversion of the targeted heteroatom is greater than 90%.

14. A method for making low-sulfur diesel fuel comprising:
    a. combining hydrogen-containing gas with a liquid hydrocarbon stream containing less than 3 wt % sulfur as organic sulfur compounds to form a feed stream;
    b. passing said feed stream over a monolithic catalyst bed containing hydrotreating catalyst components at a superficial liquid linear velocity greater than about 0.2 cm/s, a feed hydrogen gas to liquid feed volume ratio greater than about 50 NL/L, a liquid hourly space velocity greater than about 0.7 $h^{-1}$, a reactor pressure greater than about 20 bar, and a reaction temperature is greater than about 250° C. to convert organic sulfur compounds to hydrogen sulfide and produce a treated hydrocarbon effluent;
    c. separating the treated hydrocarbon effluent from a sour gas containing the hydrogen sulfide,
    d. wherein the separated, treated liquid hydrocarbon is a diesel fuel contains less than about 5000 wppm sulfur.

15. The method for making low-sulfur diesel fuel as described in claim 14, wherein said diesel fuel product contains less than about 15 wppm sulfur.

16. The method for making low-sulfur diesel fuel as described in claim 14, wherein said monolithic catalyst bed has a honeycomb configuration.

17. The method for making low-sulfur diesel fuel as described in claim 14, wherein said hydrotreating catalyst components are from the group of cobalt, molybdenum, nickel, tungsten, and phosphorous.

18. The method for making low-sulfur diesel fuel as described in claim 14, wherein the superficial liquid linear velocity is greater than about 0.02 cm/s, the feed hydrogen gas to liquid feed volume ratio is greater than about 10 NL/L, the liquid hourly space velocity is greater than about 0.1 h$^{-1}$, the reactor pressure is greater than about 1 bar, and the reaction temperature is greater than about 200° C.

19. The method for making low-sulfur diesel fuel as described in claim 18, wherein the feed hydrogen gas to liquid feed volume ratio is greater than about 50 NL/L, the liquid hourly space velocity is greater than about 0.7 h$^{-1}$, the reactor pressure is greater than about 20 bar, and the reaction temperature is greater than about 250° C.

20. The method for making low-sulfur diesel fuel as described in claim 18, wherein the superficial liquid linear velocity is greater than about 0.2 cm/s.

21. A method for increasing one-pass heteroatom conversion in a hydrotreating reactor while maintaining hydrotreating selectivity, comprising:
   a. combining hydrogen-containing gas with a liquid hydrocarbon stream containing sulfur, nitrogen, metal or oxygen heteroatoms to form a feed stream;
   b. passing said feed stream over a monolithic honeycomb catalyst bed containing hydrotreating catalyst components to react the heteroatoms with hydrogen;
   c. said monolithic honeycomb catalyst bed having a cell density greater than about 10 cpsi and channel opening diameters greater than about 0.1 mm;
   d. wherein the superficial liquid linear velocity of said feed stream is greater than about 0.2 cm/s, the feed hydrogen gas to liquid feed volume ratio is greater than about 50 NL/L, the liquid hourly space velocity is greater than about 0.7 h$^{-1}$, the reactor pressure is greater than about 20 bar, and the reaction temperature is greater than about 250° C.;
   e. and wherein the one-pass conversion of the targeted heteroatom is greater than 50% with comparable product and feed distillation points.

22. The method for increasing one-pass heteroatom conversion in a hydrotreating reactor while maintaining hydrotreating selectivity as described in claim 21, wherein at least 70% (vol.) of the product stream has a D86 distillation temperature range falling within the D86 distillation range of the feedstock.

23. The method for increasing one-pass heteroatom conversion in a hydrotreating reactor while maintaining hydrotreating selectivity as described in claim 21, wherein said one-pass conversion of the targeted heteroatom is greater than 80%.

24. The method for increasing one-pass heteroatom conversion in a hydrotreating reactor while maintaining hydrotreating selectivity as described in claim 21, wherein said one-pass conversion of the targeted heteroatom is greater than 90%.

25. A hydrotreating process for removing from a hydrocarbon feed stream in excess of 50% of the weight of sulfur present in that feed stream in a single pass through a monolith reactor, the feed stream having a boiling temperature range within the range of 70–700° C., which comprises the steps of:

passing the feed stream and a hydrogen-containing gas through the reactor at a liquid superficial linear velocity in the range of about 0.2 to about 10 cm/s, a hydrogen-containing gas-to-liquid volume ratio of about 10–2000 NL/L, a reaction temperature in the range of 200–500° C., a reactor pressures in the range of 100–2000 psig, and a liquid hourly space velocity (LHSV) in the range of 0.7–500 h$^{-1}$ to provide a hydrocarbon product stream.

26. A method in accordance with claim 25 wherein the hydrocarbon feed stream is a refinery or petrochemical liquid streams selected from the group consisting of petroleum distillates, gas oils, and gasoline blendstocks.

27. A method in accordance with claim 25 wherein the hydrocarbon product stream is a diesel fuel product containing less than 5000 wppm sulfur, and wherein at least 70% (vol.) of the diesel fuel product has a D86 distillation temperature range falling within the D86 distillation range of the hydrocarbon feed stream.

28. A method in accordance with claim 25 wherein in excess of 90% of the sulfur present in the feed stream is removed in a single pass through the reactor, and wherein: the liquid superficial linear velocity is in the range of 0.5 to about 5 cm/s, the hydrogen-containing gas-to-liquid ratio is in the range of 50–300 NL/L, the reaction temperature is in the range of 250 to about 400° C., the reactor pressure is in the range of 300–1000 psig., and the liquid hourly space velocity is in the range of 0.7–50 h$^{-1}$.

* * * * *